United States Patent
Bestle et al.

(10) Patent No.: US 7,525,597 B2
(45) Date of Patent: Apr. 28, 2009

(54) DIGITAL CAMERA MODULE FOR MOBILE COMMUNICATION DEVICE

(75) Inventors: Nikolaj Bestle, Copenhagen (DK); Lars Friis, Birkerod (DK); Esbjorn Schroll, Copenhagen (DK); Todd Wood, Santa Monica, CA (US); Thomas Vad, Lyngo (DK); Jacob Schlunsen, Copenhagen (DK); Lars Aresteen, Valby (DK)

(73) Assignee: Nokia Corporation, Espoo, FL (US)

( * ) Notice: Subject to any disclaimer, the term of this patent is extended or adjusted under 35 U.S.C. 154(b) by 365 days.

(21) Appl. No.: 11/399,290

(22) Filed: Apr. 6, 2006

(65) Prior Publication Data
US 2006/0262183 A1     Nov. 23, 2006

Related U.S. Application Data

(60) Provisional application No. 60/668,693, filed on Apr. 6, 2005.

(51) Int. Cl.
*H04N 5/225* (2006.01)
*H04B 1/38* (2006.01)
*H04M 1/00* (2006.01)

(52) U.S. Cl. .......... 348/376; 348/375; 455/90.3; 455/575.4; 455/575.8

(58) Field of Classification Search ........... 348/207.99, 348/373–376; 455/556.1, 556.2, 575.1, 575.4, 455/575.8, 90.3, 550.1; D16/208, 211, 212
See application file for complete search history.

(56) References Cited

U.S. PATENT DOCUMENTS

| | | | |
|---|---|---|---|
| 6,215,993 B1 * | 4/2001 | Ulveland | 455/415 |
| 7,249,959 B2 * | 7/2007 | Pettersson et al. | 439/142 |
| 2003/0211874 A1 * | 11/2003 | Mizuta et al. | 455/575.4 |
| 2005/0014538 A1 * | 1/2005 | Hyun et al. | 455/575.4 |
| 2005/0049019 A1 * | 3/2005 | Lee | 455/575.4 |
| 2006/0234786 A1 * | 10/2006 | Taniguchi et al. | 455/575.4 |

FOREIGN PATENT DOCUMENTS

WO     2004/080039 A1     9/2004
WO     WO2004080039 A1 *     9/2004

OTHER PUBLICATIONS

International Search Report and Written Opinion, PCT/US06/13135, mailed Jun. 16, 2008.

* cited by examiner

*Primary Examiner*—Sinh N Tran
*Assistant Examiner*—Daniel M Pasiewicz
(74) *Attorney, Agent, or Firm*—Perman & Green, LLP

(57) ABSTRACT

A digital camera module is conveniently packaged within an electronic device for sliding motion between a stored position and an operational position. The camera module is nested within the electronic device in the closed position to provide a streamlined external contour.

18 Claims, 4 Drawing Sheets

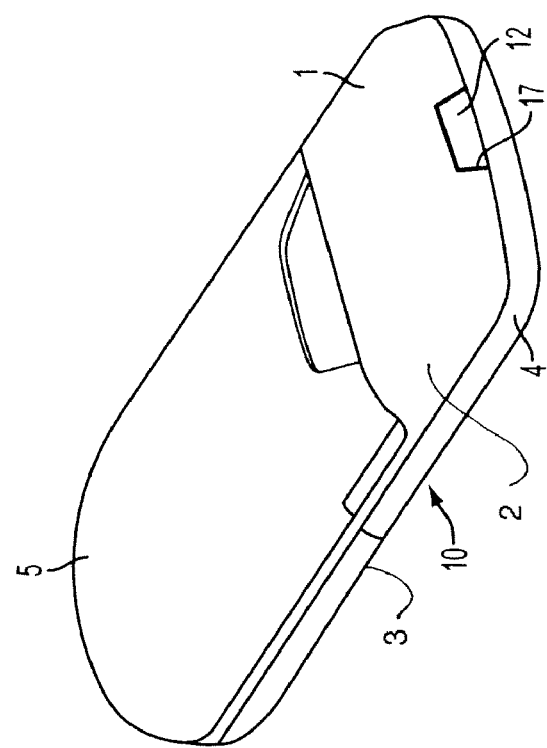
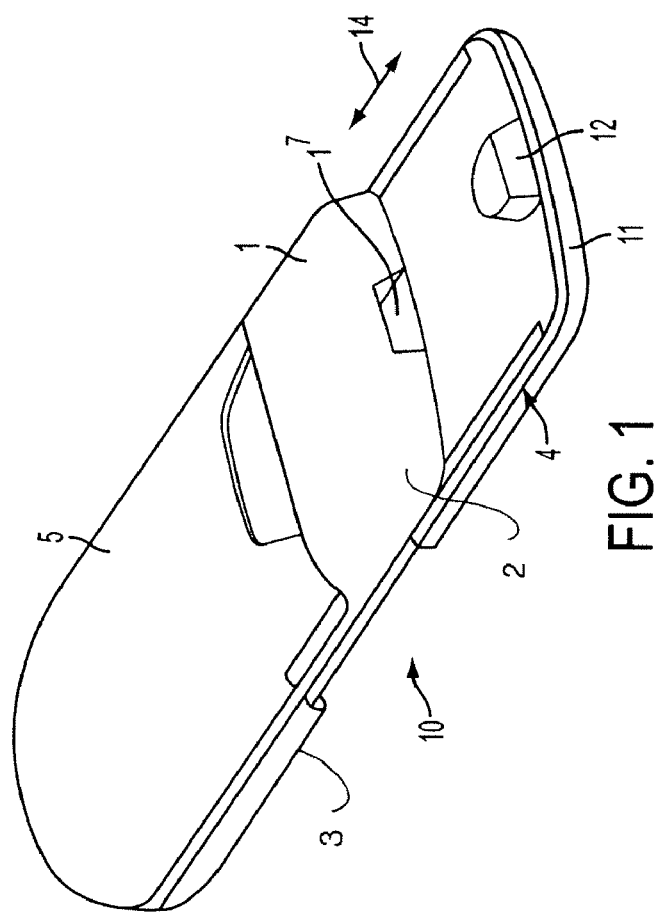

DIGITAL CAMERA MODULE FOR MOBILE COMMUNICATION DEVICE

RELATED APPLICATIONS

This application claims the benefit of U.S. Provisional Application for Patent No. 60/668,693, filed Apr. 6, 2005.

BACKGROUND

1. Field

The subject matter of this application relates to an arrangement of components that combines the functions of a multi-use electronic device with a digital camera. More specifically, this application describes a digital camera module that is conveniently packaged within an electronic device for sliding motion between a stored position and an operational position.

2. Brief Description of Related Developments

Mobile telephones and similar communication devices now provide a multitude of services, such as, Internet access, personal information management, facsimile, text messaging, picture, video, radio, in addition to telephone communication. It would be advantageous to provide a digital camera module for use with such multifunction electronic devices.

SUMMARY

A digital camera module is arranged on a flat panel and includes the basic components of a functional camera. A lens is mounted for scanning a field of view in a direction generally transverse to the plane of the panel. An image sensor is contained within the panel for receiving light signals captured by the lens and converting such signals to digital image data. The digital image data is processed by a microprocessor controller within the host device for display on a display screen of the host device, transmission over a cellular network, or other purpose. The host device is constructed with means to receive the camera module for sliding motion on the device, the means including a recess, shaped to accommodate a camera lens, in particular a zoom lens.

BRIEF DESCRIPTION OF THE DRAWINGS

Aspects of the embodiments of the invention are explained in more detail below with reference to the accompanying drawing, in which:

FIG. 1 is a perspective view of an electronic device with an embodiment of the camera module extended in the operational position;

FIG. 2 is a perspective view of the electronic device of FIG. 1 with the camera module in the stored position;

DESCRIPTION OF THE PREFERRED EMBODIMENT

Figure 3:
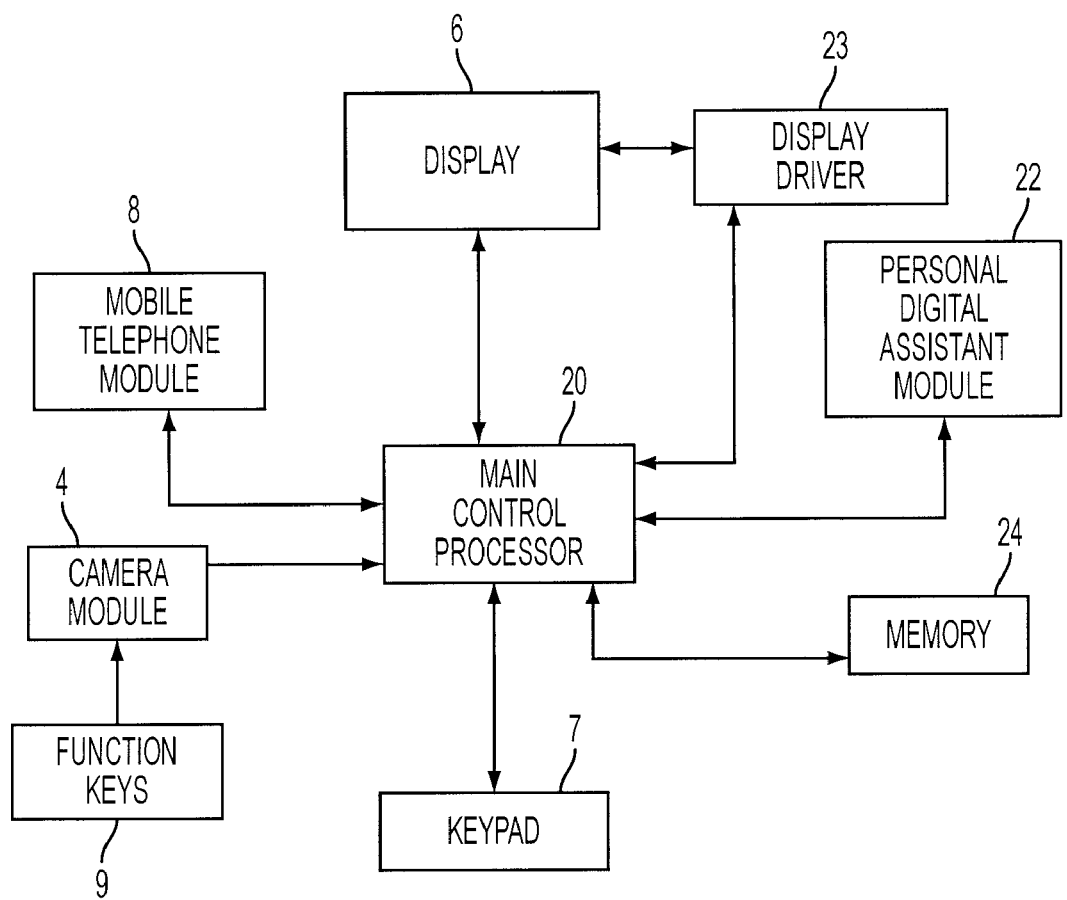
FIG. 3 is a block diagram of an electronic device in which the camera module of this invention may be used.

A multifunctional device 10, for example, a combination PDA cellular telephone incorporating features of the disclosed embodiments, is illustrated in the figures. Although aspects of the invention will be described with reference to the embodiments shown in the drawings, it should be understood that the embodiments may have many alternate forms. In addition, any suitable size, shape or type of elements or materials could be used.

Electronic device 10, may be designed to provide a wide variety of functions including, personal digital assistant, Internet access, cellular telephone, clock, radio, and others. For convenience, the subject invention is discussed herein in the context of a mobile telephone. However, embodiments of the camera module are intended to be packaged with a wide variety of electronic devices.

Mobile communications device 10 may be constructed having a body 1 with upper and lower surfaces 2 and 3 respectively. Body 1 is constructed to provide an enclosure to house the main components of the device. Such components that are used by a typical multi-function electronic device, including a PDA module 22, are shown in FIG. 3, and may be used in conjunction with the cameral module 4 of this invention. PDA module 22 is operated in conjunction with software that may be resident in memory 24 and executed by control processor 20. Display 6 provides images for viewing by the user in operative association with display driver 23. Similarly a mobile communication function is provided by mobile telephone module 8 in operative association with controller 20 and the other components of device 10.

Figure 4:
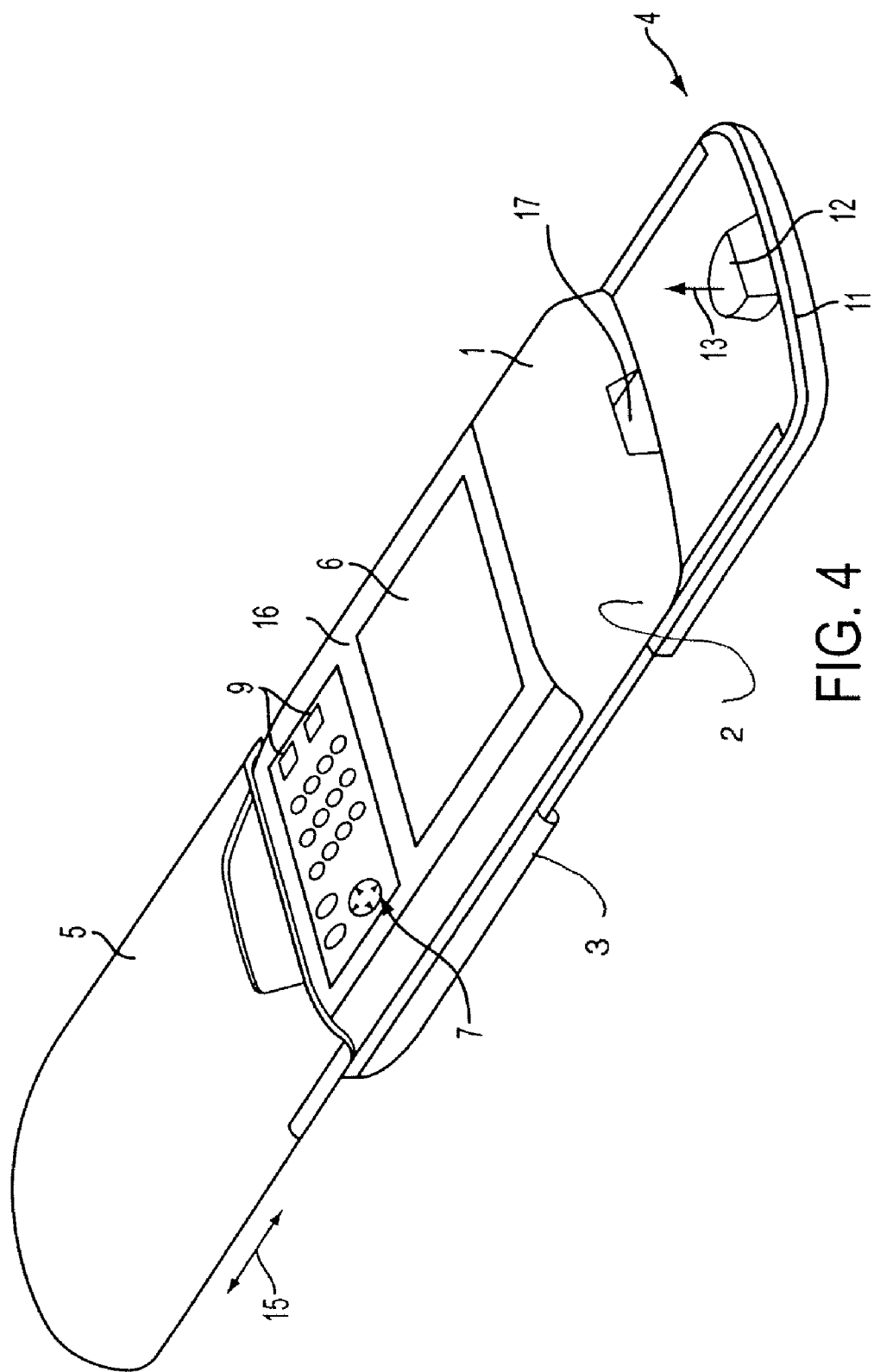
FIG. 4 is a perspective view of the device of FIG. 1 with cover of the electronic device open.

As shown in FIG. 4, a cover 5 is mounted on the body 1 for sliding motion, as shown by arrow 15, or pivotal movement to expose a function deck 16 on upper surface 2. Function deck 16 contains display 6 and keypad 7 for use with cellular phone module 8 and such other devices that may relate to the application features offered to the user. Keys 9 for operating the camera module 4 may also be provided as part of the keypad 7.

Figure 5:
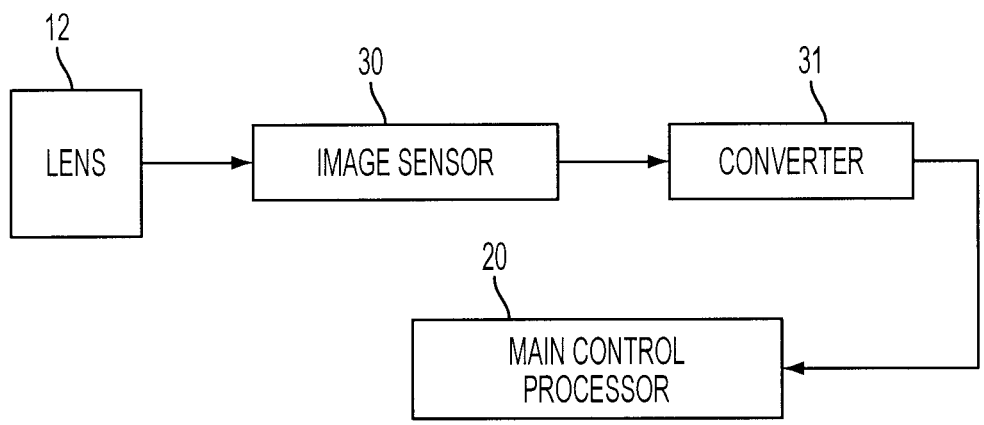
FIG. 5 is a block diagram of a digital camera according to an embodiment of this application.

Digital camera module 4 is constructed as a flat panel 11 which contains the basic components of a functional digital camera. A lens 12, preferably a zoom lens, is mounted for scanning a field of view in a direction generally transverse to the plane of the panel 11, as shown by arrow 13 in FIG. 1 and 4. As shown in FIG. 5, an image sensor 30 is contained within the panel and receives light signals captured by the lens 12. A processor 31 converts such signals to digital image data. The digital image data is sent to microprocessor controller 20, as shown in FIG. 3, within the host device 10. The image data may be processed for display on display screen 6 through display driver 23, for storage in memory 24, or for transmission over a cellular network via mobile telephone 8.

Flat panel 11 is mounted on the lower surface 3 of body 1 for sliding motion, as shown by arrow 14, in FIGS. 1 and 4. Although the sliding motion is shown as parallel with the longitudinal axis of the device, it may be advantageous in an alternate embodiment to attach the panel 11 for sliding motion transverse to the longitudinal axis. The attachment of flat panel 11 may be accomplished by any suitable interface, such as a slot and rail configuration, that would be molded into the mating surfaces of panel 11 and lower surface 3. In order to accommodate the protrusion of cameral lens 12 from the panel 11, a recess 17 is constructed in the lower surface 3 to accommodate the lens 12. This is especially important where the camera lens 12 includes a zoom function. In such cases the lens 12 will necessarily extend significantly outward from the plane of flat panel 11. In the closed position, camera panel 11 is therefore nested conveniently on the lower surface 3 of the host device 10 with the lens 12 received in recess 17, as shown in FIG. 1. In this manner, the thickness of the host device may be streamlined with a minimum thickness in spite of the camera module and the overall contour of the electronic device is not significantly altered by incorporation of the digital camera panel.

The components of the camera module 4 are electrically connected to the power source and other components of the host device 10 through a mounting interface between panel 11 and lower surface 3 or by other means such as a flexible cable. Control buttons 9 may include camera on/off and zoom functions. In addition, a switch may be used that is sensitive to the position of the panel 12 to automatically provide power to the camera when panel 12 is extended.

The panel 11 may be spring biased in the extended direction and positioned within the body 1 against the spring bias force. An actuating mechanism connected to the cover 5 may trigger the release of the panel 11 in response to the opening of the cover 5.

It should be understood that the above description is only illustrative of aspects of the invention. Various alternatives and modifications can be devised by those skilled in the art with out departing from these aspects. Accordingly, the above description is intended to embrace all such alternatives, modifications and variances which fall with the scope of the appended claims.

The invention claimed is:

1. An electronic device comprising:
   a body having a top and a bottom containing a display, a keypad, and a processor of the electronic device;
   a panel mounted on the bottom of the body for sliding movement relative to the body from a closed position to an open position, said panel having upper and lower surfaces, said panel adapted to enclose only a digital camera module connected to the display, keypad, and processor for operation in association therewith when the panel is in the open position; and
   a cover panel mounted on the top of the body for sliding motion relative to the body from a cover position over the display and keypad and an open position in which the display and keypad are exposed.

2. The electronic device according to claim 1, further comprising:
   a lens in operative cooperation with the camera module, said lens extending outward from the panel; and
   a recess constructed in the body to receive the lens when the panel is in the closed position.

3. The electronic device according to claim 1, wherein the sliding motion of the panel is parallel to a longitudinal axis of the electronic device.

4. The electronic device according to claim 1, wherein the sliding motion of the panel is transverse to a longitudinal axis of the electronic device.

5. The electronic device according to claim 2, wherein the lens is a zoom lens.

6. The electronic device according to claim 1, wherein the camera is energized by extension of the panel.

7. The electronic device according to claim 1, wherein movement of the panel is biased by a spring force in the open position and is locked against said spring force in the closed position by an actuating mechanism, wherein operation of the actuating mechanism serves to release the spring force and extend the panel.

8. The electronic device according to claim 1, wherein the camera module is operatively associated with the processor to enable said processor to receive image data from the camera module and process said image data for use.

9. The electronic device according to claim 2 wherein the lens extends outward from the upper surface of the panel.

10. A digital camera module for use in an electronic device, said electronic device having a body with a top and a bottom, a display, a keypad, and a processor enclosed in said body and a cover panel mounted on the top of the body for sliding motion relative to the body from a cover position over the display and keypad and an open position in which the display and keypad are exposed, comprising:
    a panel mounted on the bottom of the body for sliding movement relative to the body from a closed position to an open position, said panel having upper and lower surfaces, said panel adapted to enclose only a digital camera module connected to the display, keypad, and processor for operation in association therewith when the panel is in the open position; and
    wherein said panel is nested within the body in the closed position to provide a streamlined body contour.

11. The camera module according to claim 10 further comprising:
    a lens in operative cooperation with the camera module, said lens extending outward from the panel; and
    a recess constructed in the body to receive the lens when the panel is in the closed position.

12. The camera module according to claim 10, wherein the sliding motion of the panel is parallel to a longitudinal axis of the electronic device.

13. The camera module according to claim 10, wherein the sliding motion of the panel is transverse to a longitudinal axis of the electronic device.

14. The camera module according to claim 11, wherein the lens is a zoom lens.

15. The camera module according to claim 10, wherein the camera is energized by extension of the panel.

16. The camera module according to claim 10, wherein movement of the panel is biased by a spring force in the open position and is locked against said spring force in the closed position by an actuating mechanism, wherein operation of the actuating mechanism serves to release the spring force and extend the panel.

17. The camera module according to claim 10, wherein the camera module is operatively associated with the processor to enable said processor to receive image data from the camera module and process said image data for use.

18. The camera module according to claim 2, wherein the lens extends outward from the upper surface of the panel.

* * * * *

UNITED STATES PATENT AND TRADEMARK OFFICE
CERTIFICATE OF CORRECTION

PATENT NO. : 7,525,597 B2
APPLICATION NO. : 11/399290
DATED : April 28, 2009
INVENTOR(S) : Bestle et al.

Page 1 of 1

It is certified that error appears in the above-identified patent and that said Letters Patent is hereby corrected as shown below:

In Column 4, claim 18 line 52, delete "2" and insert --11--, therefore

Signed and Sealed this
Twenty-fourth Day of July, 2012

David J. Kappos
*Director of the United States Patent and Trademark Office*